United States Patent [19]

Starner et al.

[11] Patent Number: 4,786,703
[45] Date of Patent: Nov. 22, 1988

[54] PROCESS FOR THE PREPARATION OF POLYISOCYANATE PREPOLYMERS AND POLYURETHANES HAVING HIGH TEMPERATURE PERFORMANCE AND LOW HYSTERESIS

[75] Inventors: William E. Starner, Freeland; Jeremiah P. Casey, Emmaus; Barton Milligan, Coplay; Susan M. Clift, North Wales, all of Pa.

[73] Assignee: Air Products and Chemicals, Inc., Allentown, Pa.

[21] Appl. No.: 38,810

[22] Filed: Apr. 15, 1987

[51] Int. Cl.$^4$ ............................................. C08G 18/30
[52] U.S. Cl. ........................................ 528/63; 528/64; 528/66; 528/76; 528/80; 528/83
[58] Field of Search .................. 528/63, 64, 66, 76, 528/80, 83

[56] References Cited

U.S. PATENT DOCUMENTS

| | | | |
|---|---|---|---|
| 2,969,386 | 1/1961 | McElroy | 260/471 |
| 3,218,348 | 11/1965 | McElroy | 260/471 |
| 3,285,951 | 11/1966 | Heiss | 260/471 |
| 3,554,872 | 1/1971 | Chang | 203/38 |
| 3,701,374 | 10/1972 | McGillvary | 152/330 |
| 3,963,681 | 6/1976 | Kaneko | 260/77.5 |
| 4,029,730 | 6/1977 | Shroeder | 264/315 |
| 4,089,822 | 5/1978 | Vial | 260/18 |
| 4,133,943 | 1/1979 | Blanhak | 521/163 |
| 4,182,825 | 1/1980 | Jackle | 528/44 |
| 4,365,051 | 12/1982 | Chung | 528/64 |
| 4,507,459 | 3/1985 | Schmidt | 528/64 |
| 4,519,432 | 5/1985 | Schmidt | 152/357 |
| 4,556,703 | 12/1985 | Megna | 528/49 |

*Primary Examiner*—John Kight
*Assistant Examiner*—Samuel A. Acquah
*Attorney, Agent, or Firm*—Russell L. Brewer; James C. Simmons; William F. Marsh

[57] ABSTRACT

This invention relates to a polyisocyanate prepolymer for polyurethane/urea elastomer synthesis and to the resulting elastomer. The prepolymer is formed by reacting toluenediisocyanate with a long chain polyol under conditions such that essentially a 2:1 adduct is formed. Excess toluenediisocyanate is removed prior to forming the elastomer.

16 Claims, No Drawings

PROCESS FOR THE PREPARATION OF POLYISOCYANATE PREPOLYMERS AND POLYURETHANES HAVING HIGH TEMPERATURE PERFORMANCE AND LOW HYSTERESIS

TECHNICAL FIELD

This invention relates to polyisocyanate prepolymers for use in preparing polyurethane and polyurethane/urea elastomers and to the resulting elastomers prepared from the prepolymers.

BACKGROUND OF THE INVENTION

The preparation of polyurethanes and polyurethane/urea elastomers by reacting an aromatic isocyanate with a polyol and then chain extending with a short chain diol or aromatic diamine to form the elastomer is well known. Two processes are used, namely, the prepolymer process and the one shot process which includes reaction injection molding (RIM). A reactant system widely used in the prepolymer process utilizes toluenediisocyanate as the isocyanate component of the prepolymer and polytetramethylene glycol as the polyol component. (Such a system is sold under the trademark Adiprene). Then, the prepolymer is contacted with an aromatic diamine chain extender and the formulation is molded.

The prepolymers using toluenediisocyanate as the isocyanate component have suffered because toluene diisocyanate is volatile and toxic thus requiring special handling procedures. Another is that free toluenediisocyanate remains in the prepolymer and unless extracted, is too reactive for use with all but inactive chain extenders, e.g., methylene bis(orthochloroaniline) (MOCA). U.S. Pat. Nos. 2,969,386; 3,285,951 and 3,218,348 disclose some of the problems associated with the use of toluenediisocyanate for use in urethane systems.

The prior art has produced a variety of prepolymer systems from toluenediisocyanate (TDI) and long chain polyols and such prior art then include the following patents:

McGillvary, U.S. Pat. No. 3,701,374, discloses a polyurethane pneumatic tire with excellent strength, elasticity, tear resistance, flat-spotting properties, and overall performance in service, both at ambient and elevated temperature. The elastomer utilized is obtained by chain extending a polyisocyanate prepolymer, prepared by reacting a stoichiometric excess of toluenediisocyanate with 1000 molecular weight (mw) poly(tetramethylene glycol) at 70°-80° C.

Kaneko, et al, U.S. Pat. No. 3,963,681, discloses urethane elastomers having improved mechanical properties. The prepolymer is prepared by reacting a stoichiometric excess of TDI with a polyether polyol having an average mw range of 1000 to less than 450 and a molecular weight distribution curve with at least 2 peaks, one at higher and one at lower mw range. The prepolymer then is chain extended with a curing agent.

Schroeder, U.S. Pat. No. 4,029,730, discloses a cordless vehicle tire with an elastomeric polyurethane sidewall from a polyisocyanate prepolymer chain extended with a methylenedianiline/salt complex. The polyisocyanate prepolymer utilized is prepared by reacting a stoichiometric amount of toluenediisocyanate with a polyol at 80°-90° C. for 2-4 hrs.

Vial, et al, U.S. Pat. No. 4,089,822, discloses a polyurethane elastomer exhibiting a low glass transition temperature. It is formed by reacting a polymeric diol with a slight stoichiometric excess of toluenediisocyanate, and chain extending the resultant prepolymer with 2,6-dichloro-p-phenylene-diamine.

Blahak, et al, U.S. Pat. No. 4,133,943, describe an improved process for the production of polyurethane/urea elastomers, in which diamines containing ester groups are used as chain extenders. The polyisocyanate prepolymer utilized in the system was prepared from a polyol and a slight stoichiometric excess of toluenediisocyanate.

Chung, et al, U.S. Pat. No. 4,365,051, describe polyurethanes prepared from diamines, substituted butylbenzoate, benzonitriles, or benzoates, and polyisocyanate prepolymers. The prepolymers are prepared by reacting a stoichiometric excess of aromatic diisocyanate with polyol.

Although the elastomers above have desirable properties, the above mentioned prepolymer preparations have shortcomings in terms of many commercial applications, they are:

1. there is unreacted toluenediisocyanate in the prepolymer and its presence may cause toxicity and reactivity problems,
2. stoichiometric excesses of toluenediisocyanate may cause high oligomer content leading to non-uniformity in elastomer hard segments, and
3. high temperature prepolymer processing results in by-product formation, probably biuret and trimer by-product, which allows hard segment crosslinking and therefore results in lower isocyanate content.

There is some elastomer art which discloses the use of prepolymers free of unreacted toluenediisocyanate. This art is as follows:

Jackle, U.S. Pat. No. 4,182,825, shows polyurethanes with superior dynamic properties produced from polyisocyanate prepolymers, free of unreacted toluenediisocyanate (TDI). The TDI is removed by thin film distillation. A polyisocyanate prepolymer is prepared by reacting a polyether polyol with a stoichiometric amount, e.g., 1.97:1 NCO to OH or slight excess of 80/20 2,4-/2,6-TDI and then removing the unreacted TDI.

Megna, U.S. Pat. No. 4,556,703 discloses the preparation of polyurethanes using toluenediisocyanate feed systems high in 2,6-isomer content for the preparation of the prepolymer. After prepolymer formation, the excess or unreacted toluenediisocyanate is removed. The higher concentrations of 2,6-isomer result in elastomers having lower heat buildup on flexing.

Schmidt, et al, U.S. Pat. Nos. 4,507,459 & 4,519,432, describe the synthesis of polyurethanes having low hysteresis. A prepolymer of a mononuclear aromatic diisocyanate and polyol are reacted with a chain extender mixture of mononuclear aromatic diamine and polyol. The polyisocyanate prepolymer is prepared by reacting a stoichiometric excess of toluenediisocyanate with polyol.

Some patents although not relevant for polyurethane synthesis show techniques for separating the 2,4-toluenediisocyanate isomer from the 2,6-isomer by reaction with a long chain polyol. For example, U.S. Pat. No. 3,554,872 shows reacting toluenediisocyanate with a long chain diol at a mole ratio of about 3.5 to 1 toluenediisocyanate to diol at 25°-30° C. Distillation of the prepolymer to remove unreacted toluenediisocyante was carried out at temperatures from 130°-150° C.

SUMMARY OF THE INVENTION

This invention relates to a process for producing polyurethane/polyurea elastomers and to the elastomers themselves utilizing a toluenediisocyanate based prepolymer free of unreacted toluenediisocyanate and essentially free of oligomeric toluenediisocyanate by-products. The prepolymer is prepared by reacting toluenediisocyanate with a long chain polyol where the mole ratio of toluene diisocyanate to polyol is in the range of at least 4 to 20:1 and preferably in the range of from 6 to 10:1 with reaction temperatures ranging from 0° to about 90° C. After formation of the prepolymer, the unreacted toluenediisocyanate is removed from the prepolymer to produce a toluenediisocyanate free prepolymer. The elastomer is then made by reacting the resultant prepolymer with an aromatic diamine.

Significant advantages associated with the prepolymer of this invention and the process for producing such prepolymers are:

an ability to use commercial isomer mixtures of toluenediisocyanate to produce the prepolymer;

a prepolymer system capable of producing elastomers having outstanding high temperature physical properties including low hysteresis;

a prepolymer which can be used for producing an elastomer having excellent thermal properties; and a relatively straightforward process utilizing conventional processing equipment and techniques.

DETAILED DESCRIPTION OF THE INVENTION

The prepolymers suited for preparing the polyurethane/urea elastomers of this invention are prepared by reacting toluenediisocyanate with a long chain diol in such a way to minimize by-product formation and thereby produce a prepolymer which is essentially "perfect" in terms of stoichiometric toluenediisocyanate to polyol ratio. Polyether and polyester diols are normally used in the preparation of polyurethane elastomers. The hydroxyl-terminated polyethers are typically polyalkylene ether glycols such as poly(ethylene ether)glycol, poly(propylene ether)glycol and polytetramethylene ether glycol. Other polyethers are prepared by the copolymerization of cyclic ether such as ethylene oxide, propylene oxide, and trimethylene oxide, with various aliphatic diols such as ethylene glycol, butane diols, e.g. 1,3- and 1,4-butane diols and the like. Polyester diols can also be used for producing the polyurethane elastomers and these would include hydroxyl-terminated polyesters such as polyethylene adipate, polypropylene adipate, polyhexamethylene adipate and copolyesters prepared by copolymerizing ethylene glycol and propylene glycol with the above polyesters which include poly(1,4-butylene-ethylene)adipate and poly(1,4-butylene-propylene)adipate.

The above polyether and polyester diols are conventional for producing polyurethane elastomers and typically they have a molecular weight range of from about 650 to 3,000 and typically from 800 to about 1200.

Toluenediisocyanate is formed by the phosgenation of toluenediamine. Commercially, toluenediamine is manufactured by the dinitration of toluene and the subsequent reduction of the nitro groups to amine groups. As a result of this process, toluenediisocyanate is produced as a mixture of isomers, namely the 2,4- and 2,6-isomers with the percentages being from about 65-80% of the 2,4- and 20-35% of the 2,6-isomer by weight rather than a single product or isomer. The process of the invention is geared to toluenediisocyanate systems having a 65-80% to 20-35% and preferably an 80/20 ratio of 2,4- to 2,6-isomer through recycle to produce prepolymer having that 80/20 ratio.

In the practice of this invention considerable ingenuity is exercised in forming the prepolymer which is subsequently reacted with chain extender to produce elastomers having high temperature performance properties. First, in the prepolymer synthesis it is important to maintain a high mole ratio of toluenediisocyanate to the polyol, e.g. a range from 4 to 20:1 polyol. As the level of toluenediisocyanate to polyol approaches 4:1 and then stoichiometric, greater quantities of oligomers in the form of toluenediisocyanate by-products, are formed which detract from the performance characteristics of the polyurethane elastomer system. Preferably, the mole ratio of toluenediisocyanate to polyol in the reaction is from 6 to 10:1 moles of toluenediisocyanate to polyol to produce oligomers at less than 10% by weight and preferably less than 2% by weight.

A second parameter which is important in producing the prepolymer for a polyurethane elastomer having outstanding thermal properties is the incorporation of a high quantity of 2,6-toluenediisocyanate, i.e. higher than is achieved by a conventional process. For commercial efficiency, as well as prepolymer efficiency, it is preferred that the prepolymer product have a final 2,6-isomer content of about 20% and about 80% of the 2,4-isomer. In order to produce such prepolymer having a reacted 80/20 mixture of 2,4 to 2,6-toluenediisocyanate isomer content, the feed toluenediisocyanate used in preparing the prepolymer must contain a higher concentration of 2,6-isomer than the mole ratios prescribed. This because the 2,4-toluenediisocyanate isomer is more reactive with the hydroxyl group of the long chain diol than the 2,6-toluenediisocyanate isomer. Typically, the 2,6-toluenediisocyanate isomer content will range from 50 to 65% by weight of the toluenediisocyanate mix in order to produce a reaction product containing approximately 65-80% reacted 2,4-toluenediisocyanate isomer and 20 to 35% reacted 2,6-toluenediisocyanate.

Polyurethane/urea elastomers are prepared by reacting the prepolymer with a chain extender, suitably an aromatic diamine. Examples of chain extenders include 4,4'-methylene-bis(o-chloroaniline), 4,4'-methylene-bis-aniline, diethyltoluenediamine, 5-tert-butyl-2,4 and 3-tert-butyl-2,6-toluenediamine, 5-tert-amyl-2,4- and 3-tert-amyl 2,6-toluenediamine and chlorotoluenediamine.

The prepolymers from which the polyurethanes are prepared should have a reacted isocyanate content substantially that of stoichiometric mole ratio of toluenediisocyanate to diol, i.e., a 2:1. This objective is achieved by maintaining a high isocyanate to diol molar ratio at moderate temperatures. Maintaining a mole ratio of feed toluenediisocyanate to diol is extremely important because when the mole ratio of toluenediisocyanate to diol is lowered to slightly above stoichiometric, e.g., 10% excess, which is conventional, oligomers are formed. Higher oligomer formation results in a lower isocyanate levels in the prepolymer. A lower level of reactive isocyanate in the prepolymer diminishes performance properties in the polyurethane/urea elastomer because it reduces the quantity of diamine chain extender that can be reacted with the prepolymer to produce elastomer hard segment. Although the actual percentage difference between theoretical stoichiometric isocyanate content in prior art systems and actual isocyanate content in prior art systems appears to be small, that difference is substantial in terms of the overall properties imparted to the urethane elastomer. As noted, attempts to increase the isocyanate content in the prepolymer by addition of unreacted toluenediisocyanate, particularly by the addition of 2,6-toluenediisocyanate, resulted in failure due to rapid gelation.

Ideally in the preparation of a prepolymer for a polyurethane/urea system of this invention the actual isocyanate content should be at least 90%, and preferably at least 95% of the stoichiometric level of isocyanate for a prepolymer having a 2:1 mole ratio of toluenediisocyanate to polyol. Levels of reacted toluenediisocyanate below about 95%, and particularly below about 90% of stoichiometric, are direct evidence of toluenediisocyanate by-product formation and/or oligomer formation.

Temperature also is an important parameter in minimizing oligomer formation in the prepolymer. Typically, as temperature is increased, one must increase the mole ratio of toluenediisocyanate to polyol. As one approaches the lower end of the mole ratio range of toluenediisocyanate to polyol, one may experience higher concentrations of oligomer in the prepolymer and subsequently experience decreased properties in the resulting elastomers. On the other hand, as temperature is reduced from a maximum of about 90° C. to a level from 20°–40° C., mole ratios of toluenediisocyanate to polyol can be lowered and molar ratios as low as 4:1 toluenediisocyanate to long chain diol can be utilized. However, it is preferred that the mole ratio of toluenediisocyanate to diol is from 6 to 10:1 with the reaction being concluded at temperatures from 20°–40° C.

Although temperature control has been described as an important parameter in the reaction phase it must be recognized temperature control is also important in the recovery phase. During removal of unreacted toluenediisocyanate from the prepolymer the temperature should be maintained as low as possible to avoid reaction of the free toluenediisocyanate with the prepolymer. Substantial oligomer formation can occur during this removal phase. For this reason if distillation techniques are used to remove free toluenediisocyanate, a wiped film distillation technique should be considered in order to avoid oligomerization during prepolymer purification.

For process efficiency, it is preferred that the isomers of toluenediisocyanate reacted are within the same weight ratio as are present within the commercial supply. This reacted isomer level is achieved by utilizing a higher concentration of 2,6-toluenediisocyanate in the feed than is normally present, since the 2,6-isomer has a lower reactivity than the 2,4-toluenediisocyanate, and recycling excess back to the reactor as feed. Since the degree of reacted 2,4- and 2,6-toluenediisocyanate is a function of the concentration of each isomer in the feed, the feed to the reactor should have a 2,6-toluenediisocyanate content from 50 to 65% to produce the reacted level from 20–35% by weight of the reacted toluenediisocyanate.

After prepolymer formation unreacted toluenediisocyanate is removed from the prepolymer to produce a free toluenediisocyanate content <0.15% and preferably less than 0.1%. Higher quantities of unreacted toluenediisocyanate tend to cause gelatin during molding.

Elastomer formulation is carried out in conventional manner. For example, a catalyst may be used to enhance cure of the polyurethane formulation and catalysts include mono and dicarboxylic acids and their metal salts as well as tertiary amines. Examples of catalysts commonly used include glutaric acid, propionic acid, and triethylenediamine and N-ethylmorpholine. Optionally, a metal promoter such as dibutyl tin dilaurate may be used. Other additives may be added and such addition is within the skill of the art.

The following examples are provided to illustrate embodiments of the invention and are not intended to restrict the scope thereof.

EXAMPLE 1

Prepolymer Synthesis 1393.3 gms. (8 moles) of toluenediisocyanate (TDI) containing 50.5% by weight of the 2,4-isomer and 49.5% by weight of the 2,6-isomer were charged to a 3 liter reactor equipped with an external heating/cooling jacket, mechanical stirrer, thermowell/thermocouple, $N_2$ purge, dropping funnel, and condenser connected to a caustic scrubber. The liquid temperature was adjusted to 20° C. by means of the cooling water, and the $N_2$ purge and agitation started. Then a 1022. gms. (1 mole) portion of 1000 mw polyoxytetramethylene glycol (sold as Terathane 1000 by Dupont) was added dropwise through the addition funnel over a 3 hr. period. Cooling water was adjusted to maintain the reaction temperature between 20° and 30° C. After addition was complete, the clear slightly yellow liquid was mixed for 18 hr. in an $N_2$ atmosphere.

The unreacted TDI was removed and recovered by thin film distillation at a pressure of 0.30–0.10 mm Hg, a temperature of 95°–100° C., a blade speed of 390–400 RPM at a feed rate of 175 gm/hr.

Approximately 1346 gm of polyisocyanate prepolymer and 1024 gm of TDI were recovered. Gas chromatography showed the recovered TDI contained 40.6% of the 2,4-TDI isomer and 59.4% of the 2,6-isomer. The calculated TDI isomer ratio in the prepolymer was 80.1/19.9% by weight 2,4-/2,6-TDI or approximately equal to commercial feed supplies and the isocyanate concentration in the prepolymer was 6.21% (6.15% theory) or within 98% by weight of theoretical. The free TDI remaining in the prepolymer was determined by HPLC and was found to be 0.07%.

EXAMPLE 2

The 2,4-/2,6-isomer ratio of the TDI recovered in Example 1. was adjusted to the original 50.5/49.5 isomer ratio by adding 368.9 gm of 80/20% by weight 2,4-/2,6-TDI to the 1024.1 gm of 40.6/59.4% by weight of the mixture of 2,4-/2,6-TDI from Example 1. and mixing. Gas chromatographic analysis showed the mixture to contain 51.0% by weight of 2,4- and 49% by weight of 2,6-TDI. This TDI isomer mixture was placed in the vessel described in Example 1 to which 1018 gm of Terathane 1000 polyol was added. The reaction of the toluenediisocyanate mixture was conducted in the manner of Example 1, and approximately 1352 gm of polyisocyante prepolymer and 985 gm of TDI were recovered.

The G.C. analysis of the recovered TDI was 40.9/59.1% by weight 2,4-/2,6-TDI, indicating a TDI isomer ratio in the prepolymer of 81.3% 2,4-TDI and 18.7% 2,6-TDI. The isocyanate concentration was 6.36% (6.15% Theory) and the free TDI in the prepolymer analyzed by HPLC was 0.09%.

EXAMPLE 3

The procedure utilized in Example 1 was repeated except that 1111 g (6.4 moles) of 2,6-toluenediisocyanate were used as the isocyanate component and 500 g (0.5 moles) of 1,000 mw PTMEG (Tetrathane 1000) were used as the diol. The prepolymer had an isocyanate content of 6.23% (theory 6.15%) and the free toluenediisocyanate was 0.07%.

EXAMPLE 4

Comparative Example

Prepolymer Synthesis—Containing Free TDI

A polyisocyanate prepolymer was prepared by conventional prepolymer methods using a stoichiometric excess of the 80/20 2,4-/2,6-TDI isomer mix as feed.

A 244.2 gm portion (1.4 moles) of 80/20 2,4-/2,6-TDI was placed in the reactor described in Example 1 and 710.8 gm (0.7 moles) of Terathane 1000 were added dropwise over a 4 hr period. The reaction temperature was raised to 95° C. and held for 6 hrs. The temperature was reduced to 65° C. and held for 18 hrs. After cooling the polyisocyanate prepolymer was recovered and 943.5 gm of product (theory—955.0 gm) was obtained. The isocyanate concentration was 5.32% (theory—6.17%) and the free TDI in the prepolymer as determined by HPLC was 2.93%. The high free toluenediisocyanate content and low isocyanate concentration as compared to Examples 1 and 2 is indicative of oligomer contamination. In this case it was greater than 33% by weight.

COMPARATIVE EXAMPLE 5, 6, AND 7

Two polyisocyanate prepolymers were prepared by a conventional prepolymer method and then freed of toluenediisocyante by thin film vacuum stripping. One batch was made using 65/35%, 2,4-/2,6-TDI respectively and the second batch used an 80/20% 2,4/2,6-% TDI isomer level as feed. The prepolymers were blended in appropriate ratios to obtain a prepolymer containing 80/20% by weight of reacted 2,4-/2,6-TDI. A 2.2:1 molar ratio of TDI to Terathane 1000 polyol was employed.

EXAMPLE 5

266.2 gm (1.53 moles) of a 65/35% 2,4-/2,6-TDI isomer mix by weight was charged to the reactor described in Example 1. Then 704.6 gm (0.695 moles) of Terathane 1000 was added dropwise over a 4 hr period. The reaction mixture was digested at 95° C. for 6 hr and then at 65° C. for 18 hr. After reaction, the reaction product was stripped of free TDI by thin film distillation. 907.9 gm of polyisocyanate prepolymer and 44.9 gm of unreacted TDI were recovered from the reaction product. The prepolymer isocyanate content was 5.23% and the free TDI content as determined by HPLC was 0.42%.

EXAMPLE 6

The procedure in Example 5 was repeated with 80/20 2,4-/2,6-TDI mixture.

Approximately 1321.9 gm of polyisocyanate prepolymer and 48.0 gm TDI. 2,4-/2,6-TDI isomer were recovered. In the distillate the weight percent 2,4- was 27.9% and the weight percent 2,6- was 72.1%.

The prepolymer isocyanate content was 5.10%, the free TDI content by HPLC was—0.39%, and the calculated 2,4/2,6-TDI isomer ratio in the prepolymer was 87.3/12.7.

EXAMPLE 7

The prepolymer prepared in Examples 5 and 6 were blended in a 2:1 ratio to obtain a prepolymer with a 2,4- to 2,6-isomer ratio of 80:20.

EXAMPLES 8–22

Cast Elastomers

Cast elastomers were prepared by conventional techniques and then tested. Physical properties were obtained using the following ASTM test methods and heat tests were performed at both ambient (25° C.) and high temperature (121° C.).

| Tensile Strength (micro) | ASTM D-412-83 |
| Percent Elongation | ASTM D-412-83 |
| Tear Strength (Die C) | ASTM D-624-81 |
| Hardness | ASTM D-2240-79 |

One cast elastomer was prepared by combining 55.0 parts of a commercial prepolymer (Component A) sold under the trademark Adiprene L-167 having an isocyanate content of 6.2% and 10.3 parts of MoCA (Component B). They were heated separately to 85° C. and degassed. The two components were mixed together and poured into a 2 piece 6 inch × 6 inch × ⅛ inch mold. The mold was closed and pressed at 2400 lb. and 100° C. for 4 hrs. The elastomer was demolded and post cured at 100° C. for 12 hrs. That elastomer, identified as Example 8, was compared against other elastomers prepared using different prepolymers as Component A or at various diol levels and chain extender levels—(Component B) as indicated.

| Example | Component A Prepolymer in Example 1 | Component B Terathane 1000 + MoCA |
|---|---|---|
| 8 | 55.0 parts Ad L-167 | 0.0 parts + 10.3 parts |
| 9 | 54.0 parts Ad L-367 | 0.0 parts + 10.2 parts |
| 10 | 55.3 parts Ex # 4 | 0.0 parts + 8.9 parts |
| 11 | 57.1 parts Ex # 7 | 0.0 parts + 8.9 parts |
| 12 | 78.8 parts Ex # 1 | 0.0 parts + 14.8 parts |
| 13 | 61.8 parts Ad L-167 | 20.8 parts + 6.6 parts |
| 14 | 58.8 parts Ad L-367 | 19.1 parts + 6.1 parts |
| 15 | 48.8 parts Ex # 4 | 13.4 parts + 4.3 parts |
| 16 | 50.4 parts Ex # 7 | 13.4 parts + 4.3 parts |
| 17 | 64.4 parts Ex # 1 | 20.8 parts + 6.6 parts |
| 18 | 61.7 parts Ad L-167 | 30.0 parts + 4.2 parts |
| 19 | 58.7 parts Ad L-367 | 27.5 parts + 3.9 parts |
| 20 | 48.8 parts Ex # 4 | 19.4 parts + 2.7 parts |
| 21 | 50.4 parts Ex # 7 | 19.4 parts + 2.7 parts |
| 22 | 53.2 parts Ex # 1 | 25.4 parts + 3.6 parts |

The test results on physical testing are reported in Table I.

TABLE 1

| Example # | 8 | 9 | 10 | 11 | 12 | 13 | 14 | 15 |
|---|---|---|---|---|---|---|---|---|

TABLE 1-continued

| Isocyanate Prepolymer | AD-L167 | AD-L367 | Example 4 | Example 7 | Example 1 | AD-L167 | AD-L367 | Example 4 |
|---|---|---|---|---|---|---|---|---|
| % NCO Reacted | 6.23 | 6.28 | 5.32 | 5.15 | 6.21 | 6.23 | 6.28 | 5.32 |
| % NCO Free | — | — | 2.93 | 0.42 | 0.07 | — | — | 2.93 |
| MoCA (equiv.) | 1.00 | 1.00 | 1.00 | 1.00 | 1.00 | 0.55 | 0.55 | 0.55 |
| Wt. % MoCA | 15.75 | 15.77 | 13.86 | 13.48 | 15.74 | 7.25 | 7.28 | 6.47 |
| T-1000 (equiv.) | . | . | . | . | . | 0.45 | 0.45 | 0.45 |
| Shore Hardness A/D | 95/48 | Could | Could | 94/43 | 96/52 | 81/33 | 83/36 | 83/33 |
| Temperature (°C.) | 25/121 | not | not | 25/121 | 25/121 | 25/121 | 25/121 | 25/121 |
| 100% tensile (psi) | 1860/980 | test | test | 2010/1160 | 1970/1270 | 570/450 | 680/580 | 790/. |
| 200% tensile (psi) | 2650/1190 | | | 2840/. | 2440/1520 | 730/510 | 920/710 | 1110/. |
| 300% tensile (psi) | 3680/1590 | | | 4100/. | 3270/1740 | 920/600 | 1210/. | 1600/. |
| Break tensile (psi) | 4410/1650 | | | 4880/1300 | 4560/2190 | 2190/530 | 3020/710 | 2240/650 |
| % elongation (%) | 360/300 | | | 360/160 | 420/340 | 760/260 | 710/230 | 400/70 |
| Tear resistance (pli) | 670/300 | | | 640/220 | 680/410 | 330/200 | 360/130 | 390/110 |

| Example # | 16 | 17 | 18 | 19 | 20 | 21 | 22 |
|---|---|---|---|---|---|---|---|
| Isocyanate Prepolymer | Example 7 | Example 1 | AD-L167 | AD-L367 | Example 4 | Example 7 | Example 1 |
| % NCO Reacted | 5.45 | 6.21 | 6.23 | 6.28 | 5.32 | 5.15 | 6.21 |
| % NCO Free | 0.42 | 0.07 | — | — | 2.93 | 0.42 | 0.07 |
| MoCA (equiv.) | 0.55 | 0.55 | 0.35 | 0.35 | 0.35 | 0.35 | 0.350 |
| Wt. % MoCA | 6.31 | 7.21 | 4.26 | 4.32 | 3.81 | 3.72 | 4.29 |
| T-1000 (equiv.) | 0.45 | 0.45 | 0.65 | 0.65 | 0.65 | 0.65 | 0.650 |
| Shore Hardness A/D | 81/32 | 84/36 | 72/32 | 75/28 | 74/27 | 74/27 | 77/30 |
| Temperature (°C.) | 25/121 | 25/121 | 25/121 | 25/121 | 25/121 | 25/121 | 25/121 |
| 100% tensile (psi) | 710/. | 720/650 | 300/240 | 410/370 | 460/. | 430/. | 430/400 |
| 200% tensile (psi) | 980/. | 930/. | 370/270 | 530/. | 620/. | 570/. | 530/460 |
| 300% tensile (psi) | 1330/. | 1160/. | 450/300 | 680/. | 850/. | 750/. | 660/520 |
| Break tensile (psi) | 2330/620 | 2510/690 | 1850/380 | 2480/410 | 1740/460 | 1660/410 | 2130/630 |
| % elongation (%) | 480/90 | 660/140 | 1070/420 | 910/120 | 510/80 | 570/70 | 960/410 |
| Tear resistance (pli) | 370/110 | 380/240 | 200/120 | 260/70 | 190/100 | 260/120 | 260/190 |

Premature gelation occurred in Examples 9 and 10 and eliminated the possibility of physical testing. The premature gelation is caused by the free TDI of high 2,6-isomer ratio present in the polyisocyanate prepolymer.

The test series involving Examples 8, 9, 13, 14, 18 and 19 were conducted with the commerical Adiprene prepolymer systems. Examples 10, 11, 15, 16, 20 and 21 were conducted with the toluenediisocyanate prepolymer systems as prepared in accordance with Examples 4 and 7 of this invention. As noted, systems containing unreacted toluenediisocyanate at high chain extender levels gelled at MoCA levels of 1 and could not be tested. (Examples 9 and 10) With respect to elastomer properties at 25° C. the properties are essentially similar and no apparent difference appears for elastomer Examples 8 and 11-12, in terms of their tensile, break at tensile, % elongation and tear resistance. However, when the elastomers were tested at the higher 121° C. temperature, the physical properties of Example 12, were significantly superior. In almost every test, the oligomer free toluene diisocyanate polymer system gave better results than the commercial Adiprene system and to the elastomers made from oligomer-containing prepolymers with or without free TDI. The percent elongation for the elastomer of Example 12 was substantially higher than the elastomer of Example 11 and tear resistance was significantly greater than either Example 8 and 11.

When polyol was added to the elastomer and the MoCA equivalents reduced to 0.55, (Examples 13-17), the physical properties in terms of tensile strength were substantially reduced as compared to the series of examples 8-12, a result of the reduced levels of chain extender. However, a similar pattern to that developed in Examples 8-12 appears in Example 17 which shows superior results in tensile, as compared to the elastomer of Example 13 and superior properties with respect to % elongation and tear resistance to the elastomer of Example 16.

Examples 18-22 illustrate another set of elastomers at lower equivalent MoCA level, e.g., 0.35 equivalent as compared to the 0.55 and 1 for Examples 13-17, and 8-12 respectively. As might be expected from the previous data, the physical properties for all elastomers are substantially lower at these lower MoCA levels. However, the same trend in percent elongation and tear resistance exhibited in Examples 8-12 and Examples 13-17, as constant MoCA levels, is observed at the 0.35 MoCA equivalent level. Example 22 is contrasted to Example 18 in terms of tear resistance; all of their properties remain essentially the same. However, the physical properties present in Example 22 as compared to Example 19-21, are superior in every category.

EXAMPLE 23

Hysteresis Testing

Internal heat generation of polyurethane elastomers was measured during fatigue loading of 2.5 inch×2.5 inch×⅜" hand cast polyurethane blocks. Testing was performed using a servo-hydraulic Instron model 1350 at 20 Hz with a maximum load of 4500 pounds and a ratio of minimum to maximum load of 0.1. Testing continued for 200,000 cycles and a time of 167 minutes. Throughout the test, load and stroke data were acquired using a digital oscilloscope. Data were reduced by displaying and plotting load versus stroke at various times during each fatigue test. Hysteresis was calculated from the area between the loading and unloading curves. Each valve represents an average of three to four successive cycles of loading. The internal temperature of the elastomer was measured using a thermocouple inserted through a hole drilled in the center of the block. Table 2 gives the results.

TABLE 2

| HYSTERESIS DATA | | | |
|---|---|---|---|
| Elastomer Example # | 8 | 11 | 12 |
| Isocyanate Prepolymer | AD-L167 | Ex. 7 | Ex. 1 |
| MoCA (equiv.) | 1.00 | 1.00 | 1.00 |

TABLE 2-continued

| HYSTERESIS DATA | | | |
|---|---|---|---|
| Max. Temp. Rise (°C.) | 29 | 23 | 23 |
| Max. Energy Loss (in-lb) | 8.1 | 6.4 | 4.9 |
| Final Energy Loss (in-lb) | 7.1 | 4.6 | 4.5 |
| Elastomer Example # | 13 | | 17 |
| Isocyanate Prepolymer | AD-L167 | | Ex. 1 |
| MoCA (equiv.) | 0.55 | | 0.55 |
| Max. Temp. Rise (°C.) | 62 | | 35 |
| Max. Energy Loss (in-lb) | 20.0 | | 11.1 |
| Final Energy Loss (in-lb) | 14.5 | | 9.0 |
| Example # | 18 | 21 | 22 |
| Isocyanate Prepolymer | AD-L167 | Ex. 7 | Ex. 1 |
| MoCA (equiv.) | 0.35 | 0.35 | 0.35 |
| Max. Temp. Rise (°C.) | 163+ (melts) | 74 | 69 |
| Max. Energy Loss (in-lb) | 50.2 | 22.7 | 20.5 |
| Final Energy Loss (in-lb) | 50.2 - fails at 20K cycles | 17.4 | 16.2 |

The hysteresis data should be viewed along with the other high temperature performance data (data generated at 121° C., for an overall evaluation). At constant MoCA equivalents the isocyanate prepolymer having essentially no oligomer gave superior results to any of the elastomer systems tested. Hysteresis was substantially lower as compared to the commercial Adiprene L-167 systems, elastomers of Examples 12, 17, and 22 to elastomers of Examples 8, 13 and 18 respectively. The elastomers of Examples 12, and 22 using the oligomer free isocyanate prepolymer, generally gave only slightly lower hysteresis than the toluenediisocyanate prepolymer stripped of unreacted toluenediisocyanate, examples 11 and 21, respectively. However, the physical test properties at 121° C. in examples 12 and 22 were substantially superior to those properties for Examples 11 and 21.

EXAMPLES 24-35

Comparative examples of the effect of oligomer

Using the procedure described in Example 7, elastomers were prepared from the following components.

| Example # | Component A | Component B Terathane 1000 + MoCA |
|---|---|---|
| 24 | 55.3 parts Ex # 4 | 0.0 parts + 8.9 parts |
| 25 | 56.2 parts Ex # 6 | 0.0 parts + 8.9 parts |
| 26 | 57.1 parts Ex # 7 | 0.0 parts + 8.9 parts |
| 27 | 57.6 parts Ex # 5 | 0.0 parts + 8.9 parts |
| 28 | 48.8 parts Ex # 4 | 13.4 parts + 4.3 parts |
| 29 | 49.6 parts Ex # 6 | 13.4 parts + 4.3 parts |
| 30 | 50.4 parts Ex # 7 | 13.4 parts + 4.3 parts |
| 31 | 50.9 parts Ex # 5 | 13.4 parts + 4.3 parts |
| 32 | 48.8 parts Ex # 4 | 19.4 parts + 2.7 parts |
| 33 | 49.6 parts Ex # 6 | 19.4 parts + 2.7 parts |
| 34 | 50.4 parts Ex # 7 | 19.4 parts + 2.7 parts |
| 35 | 50.9 parts Ex # 5 | 19.4 parts + 2.7 parts |

Premature gelation occurred in Example 24 and eliminated the possibility of physical testing. The physical test properties and condition are reported in Table 3.

TABLE 3

| % NCO | 5.32 | 5.25 | 5.15 | 5.10 |
|---|---|---|---|---|
| % 2,6-TDI | 20.00 | 12.70 | 20.80 | 24.90 |
| Example # | 24 | 25 | 26 | 27 |
| Isocyanate prepolymer | Ex. 4 | Ex. 6 | Ex. 7 | Ex. 5 |
| MoCA (equiv.) | 1.00 | 1.00 | 1.00 | 1.00 |
| Wt. % MoCA | 13.86 | 13.67 | 13.48 | 13.38 |
| T-1000 (equiv.) | | | | |
| Shore Hardness A/D | | 93/43 | 94/43 | 94/43 |
| Temperature (°C.) | Could not mold | 25/121 | 25/121 | 25/121 |
| 100% tensile (psi) | | 2040/ | 2010/ | 2010/ |
| 200% tensile (psi) | | 2950/ | 2840/ | 2900/ |
| 300% tensile (psi) | | 4330/ | 4100/ | 4150/ |
| Break tensile (psi) | | 4870/ | 4880/ | 4760/ |
| % elongation (%) | | 340/ | 360/ | 350/ |
| Tear resistance (pli) | | 550/ | 640/ | 570/ |
| Example # | 28 | 29 | 30 | 31 |
| Isocyanate prepolymer | Ex. 4 | Ex. 6 | Ex. 7 | Ex. 5 |
| MoCA (equiv.) | 0.55 | 0.55 | 0.55 | 0.55 |
| Wt. % MoCA | 6.47 | 6.39 | 6.31 | 6.28 |
| T-1000 (equiv.) | 0.45 | 0.45 | 0.45 | 0.45 |
| Shore Hardness A/D | 83/33 | 82/33 | 81/32 | 83/34 |
| Temperature (°C.) | 25/121 | 25/121 | 25/121 | 25/121 |
| 100% tensile (psi) | 790/ | 710/ | 710/ | 760/ |
| 200% tensile (psi) | 1110/ | 1010/ | 980/ | 1040/ |
| 300% tensile (psi) | 1600/ | 1430/ | 1330/ | 1390/ |
| Break tensile (psi) | 2240/ | 1950/ | 2330/ | 2000/ |
| % elongation (%) | 400/ | 400/ | 480/ | 430/ |
| Tear resistance (pli) | 390/ | 370/ | 370/ | 370/ |
| Example # | 32 | 33 | 34 | 35 |
| Isocyanate prepolymer | Ex. 4 | Ex. 6 | Ex. 7 | Ex. 5 |
| MoCA (equiv.) | 0.35 | 0.35 | 0.35 | 0.35 |
| Wt. % MoCA | 3.81 | 3.76 | 3.72 | 3.70 |
| T-1000 (equiv.) | 0.65 | 0.65 | 0.65 | 0.65 |
| Shore Hardness A/D | 74/27 | 73/26 | 73/26 | 74/27 |
| Temperature (°C.) | 25/121 | 25/121 | 25/121 | 25/121 |
| 100% tensile (psi) | 460/ | 430/ | 430/ | 460/ |
| 200% tensile (psi) | 620/ | 600/ | 570/ | 620/ |
| 300% tensile (psi) | 850/ | 820/ | 750/ | 820/ |
| Break tensile (psi) | 1740/ | 1500/ | 1660/ | 1930/ |
| % elongation (%) | 510/ | 480/ | 570/ | 590/ |
| Tear resistance (pli) | 190/ | 260/ | 260/ | 260/ |

EXAMPLES 36-38

Effect of 2,6-TDI Isomer on Elastomer

Using the procedure described in Example 8, elastomers 36-38 were prepared from the following components. They were compared against Examples 12, 17 and 22.

| Example # | Component A | Component B Terathane 1000 + MoCA |
|---|---|---|
| 36 | 59.1 parts Ex # 3 | 0.0 parts + 11.2 parts |
| 37 | 50.1 parts Ex # 3 | 16.2 parts + 5.2 parts |
| 38 | 45.8 parts Ex # 3 | 21.2 parts + 3.1 parts |
| 12 | 59.0 parts Ex # 1 | 0.0 parts + 11.0 parts |
| 17 | 50.1 parts Ex # 1 | 16.1 parts + 5.2 parts |
| 22 | 45.7 parts Ex # 1 | 21.2 parts + 3.0 parts |

After molding the polyurethanes were tested and the results are reported in Table 3.

TABLE 3

| Effect of 2,6-TDI Isomer | | |
|---|---|---|
| % NCO | 6.21 | 6.23 |
| % 2,6-TDI | 20.10 | 100.00 |
| Example # | 12 | 36 |
| Isocyanate prepolymer | Ex. 1 | Ex. 3 |
| MoCA (equiv.) | 1.00 | 1.00 |
| Wt. % MoCA | 15.74 | 15.75 |
| T-1000 (equiv.) | | |
| Shore Hardness A/D | 96/52 | 96/55 |
| Temperature (°C.) | 25/121 | 25/121 |
| 100% tensile (psi) | 1970/1270 | 2940/. |
| 200% tensile (psi) | 2440/1520 | 3260/. |
| 300% tensile (psi) | 3270/1740 | 4020/. |
| Break tensile (psi) | 4560/2190 | 4100/1730 |

TABLE 3-continued

| Effect of 2,6-TDI Isomer | | |
|---|---|---|
| % NCO | 6.21 | 6.23 |
| % 2,6-TDI | 20.10 | 100.00 |
| % elongation (%) | 420/340 | 320/50 |
| Tear resistance (pli) | 680/410 | 820/420 |

| Example # | 17 | 37 |
|---|---|---|
| Isocyanate prepolymer | Ex. 1 | Ex. 3 |
| MoCA (equiv.) | 0.55 | 0.55 |
| Wt. % MoCA | 7.21 | 7.24 |
| T-1000 (equiv.) | 0.45 | 0.45 |
| Shore Hardness A/D | 84/36 | 91/37 |
| Temperature (°C.) | 25/121 | 25/121 |
| 100% tensile (psi) | 720/650 | 1090/930 |
| 200% tensile (psi) | 930/. | 1420/1120 |
| 300% tensile (psi) | 1160/. | 1800/. |
| Break tensile (psi) | 2510/690 | 3320/1080 |
| % elongation (%) | 660/140 | 590/180 |
| Tear resistance (pli) | 0.0/240 | 590/290 |

| Example # | 22 | 38 |
|---|---|---|
| Isocyanate prepolymer | Ex. 1 | Ex. 3 |
| MoCA (equiv.) | 0.35 | 0.35 |
| Wt. % MoCA | 4.29 | 4.30 |
| T-1000 (equiv.) | 0.65 | 0.65 |
| Shore Hardness A/D | 77/30 | 84/34 |
| Temperature (°C.) | 25/121 | 25/121 |
| 100% tensile (psi) | 430/400 | 690/570 |
| 200% tensile (psi) | 530/460 | 910/690 |
| 300% tensile (psi) | 660/520 | 1210/820 |
| Break tensile (psi) | 2130/630 | 2450/870 |
| % elongation (%) | 960/410 | 630/360 |
| Tear resistance (pli) | 260/190 | 410/270 |
| Max. Temp. Rise (°C.) | 69 | 47 |
| Max. Energy Loss (in-lb) | 20.5 | 12.2 |
| Final Energy Loss (in-lb) | 16.2 | 10.3 |

The results above show that the oligomer-free polymer used in preparing the elastomer gave better properties, e.g., tensile and percent elongation and lower hysteresis at the 100% 2,6-TDI isomer level than Example 1 which had a 20% TDI isomer level.

What is claimed is:

1. In a process for producing a reaction product comprising a prepolymer suited for producing polyurethane/urea elastomers, wherein toluenediisocyanate is reacted with a long chain polyol to produce a prepolymer and the prepolymer reacted with an aromatic diamine, to form a polyurethane/urea elastomer, the improvement for producing such prepolymer and for enhancing physical properties in the resulting polyurethane/urea elastomer which comprises:
   (a) reacting an isomer of 2,4- or 2,6-toluene diisocyanate with a long chain diol at a temperature from about 0° to 90° C. and at a mole ratio of toluenediisocyanate to long chain diol from 4 to 20:1 to form a prepolymer such that at least about 90% of such prepolymer consists of a prepolymer of two moles toluenediisocyanate per mole of long chain diol; and
   (b) removing unreacted toluenediisocyanate from the reaction product comprising prepolymer to a level of less than about 0.15%.

2. The process of claim 1, wherein the reaction temperature is maintained from about 20° to 40° C.

3. The process of claim 2 wherein the molecular weight of said polyol is from 650 to 3000.

4. The process of claim 3 wherein an isomer mix is used and the ratio of 2,4 to 2,6-toluenediisocyanate is adjusted such that the reaction product contains from 75 to 85% by weight of reacted 2,4-toluenediisocyanate isomer and 15 to 25% by weight, of the reacted 2,6-toluenediisocyanate isomer.

5. The process of claim 4, wherein the mole ratio of toluenediisocyanate to long chain diol is maintained at a level from 6 to 10:1 during the reaction of toluenediisocyanate with the long chain diol, and the actual reacted isocyanate content, as unreacted NCO in the prepolymer, is at least 95 mole percent of the stoichiometric quantity for a 2:1 molar prepolymer of toluenediisocyanate and long chain diol.

6. The process of claim 5 wherein the long chain diol is polytetramethylene glycol.

7. The process of claim 5 wherein the long chain diol is polypropylene glycol.

8. The process of claim 5 wherein the long chain diol is of the polyester type.

9. The process of claim 3 wherein an isomer mix is used and the ratio of 2,4- to 2,6-toluenediisocyanate is adjusted such that the prepolymer contains approximately 65% of the 2,4-isomer and 35% of the 2,6-isomer.

10. The prepolymer of claim 9, wherein the % reacted 2,4-toluenediisocyanate is from 75-85% by weight of the reacted toluenediisocyanate in the prepolymer and 15-25% by weight of 2,6-toluenediisocyanate in the prepolymer.

11. The prepolymer of claim 10 wherein the polyol is polytetramethylene glycol.

12. A toluenediisocyanate end-capped prepolymer reaction product formed by the reaction of 2,4-toluenediisocyanate or 2,6-toluenediisocyanate, or mixtures thereof, and a long chain diol wherein at least 90% of the prepolymer consists of a prepolymer of 2 moles reacted toluenediisocyanate per mole of long chain diol and; further, said prepolymer reaction product having an unreacted toluenediisocyanate content of less than about 0.15% by weight of said prepolymer reaction product.

13. The prepolymer reaction product of claim 12 wherein 2,4- and 2,6-toluenediisocyanate are reacted as a mixture and the percent reacted 2,6-toluenediisocyanate is 20-35%.

14. In a polyurethane elastomer formed by the reaction of a prepolymer of toluenediisocyanate and a long chain diol with an aromatic diamine chain extender, the improvement which comprises utilizing the prepolymer reaction product of claim 12 as said prepolymer.

15. The polyurethane elastomer of claim 14 wherein 2,4-toluenediisocyanate and 2,6-toluenediisocyanate are reacted to form said prepolymer and the percent reacted 2,4-toluenediisocyanate is from about 75-85% by weight of the reacted toluenediisocyanate in the prepolymer and the percent reacted 2,6-toluenediisocyanate in the prepolymer is from about 15 to 25% by weight.

16. The polyurethane elastomer of claim 15 wherein the polyol is polytetramethylene glycol.

* * * * *

REEXAMINATION CERTIFICATE (1507th)
United States Patent [19]

Starner et al.

[11] B1 4,786,703

[45] Certificate Issued Jul. 9, 1991

[54] PROCESS FOR THE PREPARATION OF POLYISOCYANATE PREPOLYMERS AND POLYURETHANES HAVING HIGH TEMPERATURE PERFORMANCE AND LOW HYSTERESIS

[75] Inventors: William E. Starner, Freeland; Jeremiah P. Casey, Emmaus; Barton Milligan, Coplay; Susan M. Clift, North Wales, all of Pa.

[73] Assignee: Air Products and Chemicals, Inc., Allentown, Pa.

Reexamination Request:
No. 90/002,021, May 14, 1990

Reexamination Certificate for:
Patent No.: 4,786,703
Issued: Nov. 22, 1988
Appl. No.: 38,810
Filed: Apr. 15, 1987

[51] Int. Cl.$^5$ ............................................. C08G 18/30
[52] U.S. Cl. ...................................... 528/63; 528/64; 528/66
[58] Field of Search ................... 528/63, 64, 66, 76, 528/80, 83

[56] References Cited

U.S. PATENT DOCUMENTS

3,183,112  5/1965  Gemasser .

FOREIGN PATENT DOCUMENTS

1101410  1/1968  United Kingdom .

OTHER PUBLICATIONS

Singh, A. et al, "Thermal Stability of Polyester vs. Polyether Based Urethane", *Rubber Age;* vol. 98, No. 12 (Dec. 66), pp. 77–83.

Singh, A. et al, "Kinetics of Urethane Cleavage in Cross-Linked Urethanes", *J. of Polymer Science,* vol. 4, pp. 2551–2561 (1966).

*Primary Examiner*—John Kight, III

[57] ABSTRACT

This invention relates to a polyisocyanate prepolymer for polyurethane/urea elastomer synthesis and to the resulting elastomer. The prepolymer is formed by reacting toluenediisocyanate with a long chain polyol under conditions such that essentially a 2:1 adduct is formed. Excess toluenediisocyanate is removed prior to forming the elastomer.

B1 4,786,703

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10, 11 and 13 are cancelled.

Claims 1, 3, 4, 6–9 and 12 are determined to be patentable as amended.

Claims 2, 5 and 14–16, dependent on an amended claim, are determined to be patentable.

New claims 17–21 are added and determined to be patentable.

1. In a process for producing a *prepolymer* reaction product comprising a prepolymer suited for producing polyurethane/urea elastomers, wherein toluenediisocyanate is reacted with a long chain polyol to produce a prepolymer and the prepolymer reacted with an aromatic diamine[,] to form a polyurethane/urea elastomer, the improvement for producing such prepolymer reaction product and for enhancing physical properties in the resulting polyurethane/urea elastomer which comprises:

(a) reacting an isomer *mixture* of 2,4- or [2,6-toluene diisocyanate] *2,6-toluenediisocyanate* with a long chain diol at a temperature from about 0° to 90° C. [and] at a mole ratio of toluenediisocyanate to long chain diol from 4 to 20:1 [to form a prepolymer such] *with the level and ratio of 2,4- to 2,6-toluenediisocyanate isomer mixture adjusted such that the prepolymer reaction product contains from 65 to 85% by weight of reacted 2,4-toluenediisocyanate and 15 to 35% by weight of reacted 2,6-toluenediisocyanate based on reacted toluenediisocyanate and that at least about 90% of such prepolymer reaction product* consists of a prepolymer of two moles toluenediisocyante per mole of long chain diol; and (b) removing unreacted toluenediisocyanate from the *prepolymer* reaction product comprising prepolymer to a level of less than about 0.15%.

3. The process of claim [2] *1* wherein the molecular weight of said polyol is from 650 to 3000.

4. The process of claim 3 wherein [an isomer mix is used and] the ratio of 2,4 to 2,6-toluenediisocyanate is adjusted such that the *prepolymer* reaction product contains from 75 to 85% by weight of reacted 2,4-toluenediisocyanate [isomer] and 15 to 25% by weight, of [the] reacted 2,6-toluenediisocyanate [isomer].

6. The process of claim [5] *3* wherein the long chain diol is polytetramethylene glycol.

7. The process of claim [5] *3* wherein the long chain diol is polypropylene glycol.

8. The process of claim [5] *3* wherein the long chain diol is of the polyester type.

9. The process of claim 3 wherein an isomer mix is used and the *level and* ratio of 2,4- to 2,6-toluenediisocyanate is adjusted such that the prepolymer contains approximately 65% of the 2,4-isomer and 35% of the 2,6-isomer.

12. A toluenediisocyanate end-capped prepolymer reaction product formed by the reaction of [2,4-toluenediisocyanate or 2,6-toluenediisocyanate, or mixtures thereof,] *an isomer mixture of 2,4- and 2,6-toluenediisocyanate* and a long chain diol *at a temperature from about 0° to 90° C. at a mole ratio of toluenediisocyanate to long chain diol from about 6 to 10:1 with the level and ratio of 2,4- to 2,6-toluenediisocyanate isomer mixture adjusted such that the prepolymer reaction product contains from 65 to 85% by weight of reacted 2,4-toluenediisocyanate and 15 to 35% by weight of reacted 2,6-toluenediisocyanate based on reacted toluenediisocyanate and* wherein at least 90% of the prepolymer *reaction product* consists of a prepolymer of 2 moles reacted toluenediisocyanate per mole of long chain diol; and[;] , further, said prepolymer reaction product having an unreacted toluenediisocyanate content of less than about 0.15% by weight of said polymer reaction product.

*17. In a process for producing a polyurethane/urea elastomer wherein toluenediisocyanate is reacted with a long chain diol to produce a prepolymer reaction product and the prepolymer reaction product reacted with an aromatic diamine to form said polyurethane/urea elastomer, the improvement for enhancing physical properties in the resulting polyurethane/urea elastomer which comprises:*

*(a) reacting an isomer mixture of 2,4- and 2,6-toluenediisocyanate with a long chain diol at a temperature from about 0° to 90° C. at a mole ratio of toluenediisocyanate to long chain diol from about 6 to 10:1 with the level and ratio of 2,4- to 2,6-toluenediisocyanate adjusted such that the prepolymer reaction product contains from 65 to 85% by weight of reacted 2,4-toluenediisocyanate and 15 to 35% by weight of reacted 2,6-toluenediisocyanate based on reacted toluenediisocyanate and that at least about 90% of such prepolymer reaction product consists of a prepolymer of two moles toluenediisocyanate per mole of long chain diol; and,*

*(b) removing unreacted toluenediisocyanate from the prepolymer reaction product to a level of less than about 0.15%.*

*18. In a polyurethane/urea elastomer formed by the reaction of a prepolymer of toluenediisocyanate and a long chain diol with an aromatic diamine chain extender, the improvement which comprises:*

*(a) reacting an isomer mixture of 2,4- and 2,6-toluenediisocyanate with a long chain diol at a temperature from about 0° to 90° C. at a mole ratio of toluenediisocyanate to long chain diol from about 6 to 10:1 with the level and ratio of 2,4- to 2,6-toluenediisocyanate adjusted such that the prepolymer reaction product contains from 65 to 85% by weight of reacted 2,4-toluenediisocyanate and 15 to 35% by weight of reacted 2,6-toluenediisocyanate based on reacted toluenediisocyanate and that at least about 90% of such prepolymer reaction product consists of a prepolymer of two moles toluenediisocyanate per mole of long chain diol; and,*

(b) removing unreacted toluenediisocyanate from the prepolymer reaction product to a level of less than about 0.15%.

19. The polyurethane/urea elastomer of claim 18 wherein the 2,4-toluenediisocyanate is present in the polyurethane/urea elastomer in an amount from 75–85% and the 2,6-toluenediisocyanate is present in an amount from 15–25%.

20. The polyurethane/urea elastomer of claim 19 wherein methylene bis(*orthochloroaniline*) is the aromatic diamine.

21. The polyurethane/urea elastomer of claim 20 wherein the 2,4-toluenediisocyanate is present in an amount of about 80% and the 2,6-toluenediisocyanate is present in an amount of about 20%.

* * * * *